(12) United States Patent
Armstrong et al.

(10) Patent No.: US 12,241,756 B2
(45) Date of Patent: Mar. 4, 2025

(54) SYSTEM AND METHOD FOR GENERATING MULTI-RESOLUTION VOXEL SPACES

(71) Applicant: Zoox, Inc., Foster City, CA (US)

(72) Inventors: Hirotatsu Armstrong, Las Vegas, NV (US); Patrick Blaes, Redwood City, CA (US); Michael Carsten Bosse, Templeton, CA (US); Jeffrey Eric Tolliver, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 337 days.

(21) Appl. No.: 17/804,744

(22) Filed: May 31, 2022

(65) Prior Publication Data
US 2024/0094029 A1    Mar. 21, 2024

(51) Int. Cl.
| | |
|---|---|
| *G01C 22/00* | (2006.01) |
| *B60W 60/00* | (2020.01) |
| *G01C 21/00* | (2006.01) |
| *G06T 7/00* | (2017.01) |
| *G06T 7/33* | (2017.01) |

(52) U.S. Cl.
CPC ......... *G01C 21/3867* (2020.08); *B60W 60/00* (2020.02); *G01C 21/3807* (2020.08); *G06T 7/0002* (2013.01); *G06T 7/33* (2017.01)

(58) Field of Classification Search
CPC .. G01C 21/3867; G01C 21/3807; G06T 7/33; G06T 7/0002; B60W 60/00
See application file for complete search history.

(56) References Cited

U.S. PATENT DOCUMENTS

| | | |
|---|---|---|
| 10,650,285 B1* | 5/2020 | Okazaki ................ G06T 7/00 |
| 2019/0162856 A1 | 5/2019 | Atalla |
| 2021/0192689 A1 | 6/2021 | Bosse et al. |
| 2021/0192840 A1 | 6/2021 | Bosse et al. |
| 2021/0225074 A1 | 7/2021 | Meilland et al. |

FOREIGN PATENT DOCUMENTS

WO    WO2021127692 A1    6/2021

OTHER PUBLICATIONS

The PCT Search Report and Written Opinion mailed Sep. 11, 2023 for PCT application No. PCT/US23/23406, 10 pages.

* cited by examiner

*Primary Examiner* — Adam M Alharbi
(74) *Attorney, Agent, or Firm* — Lee & Hayes, P.C.

(57) ABSTRACT

Techniques for representing a scene or map based on statistical data of captured environmental data are discussed herein. In some cases, the data (such as covariance data, mean data, or the like) may be stored as a multi-resolution voxel space that includes a plurality of semantic layers. In some instances, individual semantic layers may include multiple voxel grids having differing resolutions. Multiple multi-resolution voxel spaces may be merged or aligned to generate combined scenes based on detected voxel covariances at one or more resolutions.

20 Claims, 6 Drawing Sheets

SYSTEM AND METHOD FOR GENERATING MULTI-RESOLUTION VOXEL SPACES

BACKGROUND

Data can be captured in an environment and represented as a map of the environment. Often, such maps can be used by vehicles navigating within the environment, although the maps can be used for a variety of purposes. In some cases, an environment can be represented as a two-dimensional map, while in other cases, the environment can be represented as a three-dimensional map. Further, surfaces within an environment are often represented using a plurality of polygons or triangles.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Techniques described herein are directed to generating alignments between map data comprising a multi-resolution voxel spaces. In some examples, such a multi-resolution voxel space can comprise voxels storing statistical information regarding associated measurements including, but not limited to, spatial means, covariances, and weights of point distributions of data representative of a physical environment. The map data may comprise a plurality of voxel grids (e.g., discretized volumetric representations comprising "volumetric pixels", or voxels) or layers representing the physical environment at different resolutions or physical distances. For instance, each voxel layer may represent the physical environment at some multiple (e.g., twice) the resolution as the proceeding layer. That is, a voxel at a first layer may represent a first volume (e.g., 10 cm×10 cm×10 cm) while a voxel at a second layer may represent a second volume (e.g., 20 cm×20 cm×20 cm).

Data associated with voxels of the multi-resolution voxel space may be represented as a plurality of covariance ellipsoids. The covariance ellipsoid representation may be generated based on calculated mean and covariance value of data points associated with individual voxels. For example, each of the ellipsoids may have a shape determined by one or more eigenvectors (such as three eigenvectors associated with, for instance, an X, Y, and Z measurement of associated data points) associated with the covariance matrix of the voxel. In some cases, voxel data can be associated with semantic information such as classification and/or segmentation information, and data associated with a specific classification can be associated with a particular multi-resolution voxel space associated with a specific classification. In this example, each voxel covariance semantic layer may comprise data points associated with a particular semantic class (e.g., tree, vehicle, building, etc.) as covariance ellipsoids.

In some cases, map data represented by a multi-resolution voxel space may be generated from data points representing a physical environment, such as an output of a light detection and ranging (lidar) system. For instance, the system may receive a plurality of lidar points or lidar data represented as a point cloud. The system may assign or otherwise associate the lidar points to voxels of a voxel grid having multiple resolutions (e.g., finer and coarser resolutions) based at least in part on a local reference frame of the vehicle (e.g., the system capturing the lidar points). The system may then merge or otherwise combine voxels (or data associated with the voxels) of one or more resolutions substantially concurrently to generate the final multi-resolution voxel space. As a non-limiting example, measurements may first be associated with a finest resolution voxel grid and other layers (having coarser resolutions) may be computed based on the finer resolutions, e.g., merged. In some examples, such associations and calculations may be performed substantially simultaneously (e.g., within technical tolerances). In one specific example, the voxels within the neighborhood are merged by taking a weighted sum of the individual Gaussian distributions of each voxel of the finer resolution grid.

In some implementations, the system may utilize the multi-resolution voxel space to generate alignments between the voxel spaces to assist in generating maps and scenes of the physical environment as well as to assist in localization of the vehicle within the map or scene. For instance, once a multi-resolution voxel space (e.g., a target multi-resolution voxel space), is generated for a particular scan or dataset representative of the physical environment (e.g., determined during driving, for instance), the system may determine an alignment between the generated multi-resolution voxel space with a reference multi-resolution voxel space representative of the scene. In some cases, the alignment may be generated by finding correspondences between voxels at each resolution of the reference and target multi-resolution voxel space. For example, the system may, for each voxel of a particular resolution in the target multi-resolution voxel space, search among voxels within a threshold distance or within a threshold number of voxels containing a mean target point in a corresponding particular resolution of the reference multi-resolution voxel space for occupied voxels. In examples including semantic layers, the system may, for each voxel of the particular resolution of each semantic layer in the target multi-resolution voxel space, search the neighborhood of voxels containing the mean target point in the particular resolution of the corresponding semantic layer in the reference multi-resolution voxel space.

Of the voxels identified of the reference multi-resolution voxel space, the system may select the voxel having a centroid closet to the voxel of the target multi-resolution voxel space. The system may then determine a residual (or error, etc.) for each of the matched voxels which, in at least some examples, may be based at least in part on such matched normal vectors, and subsequently perform an optimization over all such residuals. The optimization may minimize a distance between pairs of such voxel centroids and/or means. In this manner, an alignment or error between the two voxels may be determined.

During alignment, even though each layer may be merged substantially concurrently, the coarser resolutions (e.g., resolutions corresponding to larger voxels) may result in matches prior to finer resolutions. In this manner, matches in the coarser resolutions may help bring the two multi-resolution voxel spaces into a closer alignment, such that the finer resolutions are able to begin matching and complete the alignment process. In some cases, by merging captured sensor data into a multi-resolution voxel space representative of an environment, the vehicle may be able to initialize a position or localize within the environment with greater accuracy and/or more quickly than systems utilizing traditional map data comprising polygons and/or a mesh. Additionally, by storing the voxels in multi-resolution voxel spaces the data may be stored in a more easily indexable/retrievable manner thereby improving processing speeds and throughput. For example, if a coarse resolution is acceptable for a practical task, the coarse layer may be loaded into memory thereby reducing the amount of data being accessed and processed for the desired operation.

In some examples, the system may initiate the alignment or pre-align the target and reference multi-resolution voxel spaces using position data, location data, and/or the like associated with the autonomous vehicle at the time the data used to generate the target multi-resolution voxel space was generated. For example, the position data and/or location data may include Global Positioning system (GPS) data (or other satellite based position data), odometry data, inertial measurement unit (IMU) data, prior known positions and/or degrees of freedom determined based on alignments of prior multi-resolution voxel space to the refence, and the like.

In some cases, depending on the seed data (e.g., the lidar or point cloud data) used to generate the two multi-resolution voxel spaces, the system may have difficult geniting an alignment and/or geniting the alignment between the voxel spaces may require significant processing resources and/or time to converge. For example, when voxels are sparse or distant from each other two voxels (e.g., one form each voxel space) may little overlap and aligning the voxel based on covariances may be time and resource intensive. In other examples, when the initial scanning error is large (e.g., such as greater than 10 meters), in addition to consuming large amounts of resources and/or time, the voxel spaces may have difficult converging at all. In these cases, the system and methods, discussed herein, may assist with and/or improve convergence rates and speed as well as reduce the processing or computational resource consumption associated with generating alignments between the multi-resolution voxel spaces.

In one example, the system may cause coarser voxel resolutions to align or converge prior to initiating alignment of finer resolutions. For example, the system may allow voxels greater than a predetermined threshold to align during initial stages of the process. For instance, in one specific example, the system may allow voxels of a resolution of 25 meters or greater to begin alignment in the initial stage. The system may then, for instance, iteratively add the next finer resolution to the convergence process as the system determines an error of less than an error threshold. In some cases, the error threshold for the next finer resolution may be an average error of the voxels being less than or equal to half the size of current finest resolution (e.g., if the current finest resolution is 25 meters, the system may add the next finer resolution when the error is less than or equal to 12.5 meters). In other examples, the error threshold for the next finer resolution may be an average error of the voxels is less than or equal to a quarter of the size of current finest resolution or the like.

In this example, the system may continue to iterate stages of alignment until each of the resolutions has been added. In some cases, the system may continue to iterate after all of the resolutions have been added for a predetermined number of iterations (e.g., one iteration, two iterations, three iterations, five iterations, or the like) with all of the resolutions or until the average error is less than or equal to a final error threshold or until a change in the sum of residuals of the voxels less than or equal to a change threshold.

In another example, the system may also, during alignment, rate, weight, or otherwise score eigenvalues of voxels and utilize the weight to select eigenvectors and/or voxels for use in alignment. For example, as discussed above, the voxel may have a set of three or more eigenvalues (providing the episode shape of the voxel). The system may then determine score or weight the eigenvectors or voxels based at least in part on the size of the eigenvalues. In some implementations, the system may evaluate the individual eigenvalues against one or more predetermined heuristics to determine the weight. For example, the system may then determine if one or more of the eigenvalues for a voxel is less than or equal to one or more thresholds when generating the score. In some cases, the one or more thresholds may be relative to the size of the voxel or the size of the associated resolution. In other implementations, the system may utilize one or more machine learned models to evaluate and/or score the individual eigenvalues. The system may then select voxels associated with higher scores (e.g., based on their eigenvalues, or other characteristics as discussed herein— e.g., number of points, quality metric, etc.) in the alignment process.

In some examples, the multi-resolution voxel space may include multiple voxel layers for a given resolution, individual layers may be associated with different semantic classes. For example, a first voxel layer of a resolution may be associated with buildings, a second voxel layer of the resolution may be associated with a ground plane, and/or a third voxel layer of the resolution may be associated with vegetation. In this example, the system may also utilize the semantic class assigned to the voxel to fit or regress a quality or trust metric of the individual voxel within a resolution. For instance, the system may generate and/or train a noise model to evaluate the quality of the voxels based at least in part on the eigenvalues of the voxel, the voxel resolution, a number of points associated with the merged voxel, and a semantic class of the merged voxel. The system may then utilize the quality or trust metric to select voxels for use in the alignment process. For example, the system may determine a scale factor correction for the multi-resolution voxel space by random sampling (such as Monte Carlo technique) the voxels based at least in part the quality or trust metric. In some cases, the scale factor correction may be utilized as a metric to determine the overall quality of the resulting alignment.

In some cases, by aligning coarser resolutions prior to finer resolutions, utilizing a weight for the eigenvalues of the voxels to determine eigenvectors for use in alignment, and utilizing a quality or trust metric of voxels for use in alignment, the system may converge the multi-resolution voxel space in a more time efficient manner with fewer processing resources as well as to generate a higher quality multi-resolution voxel space that is more representative of the corresponding physical environment.

As discussed herein, the system and method allow processes for alignment between multi-resolution voxel spaces to converge in a more efficient manner. For example, the system and method allows the between multi-resolution voxel spaces to converge in a smaller period of time while consuming less resources than conventional systems. In some cases, by reducing the period of time associated with convergence, an autonomous vehicle may make operational decisions, including safety related decisions, in a more timely manner. Further, the system and methods, discussed herein, may result in more accurate alignments between a target multi-resolution voxel space and a reference multi-resolution voxel spaces, thereby, allowing the autonomous vehicle to perform operations with a more accurate awareness of the environment surrounding the vehicle, generally resulting in safer operation of such systems.

Figure 1:
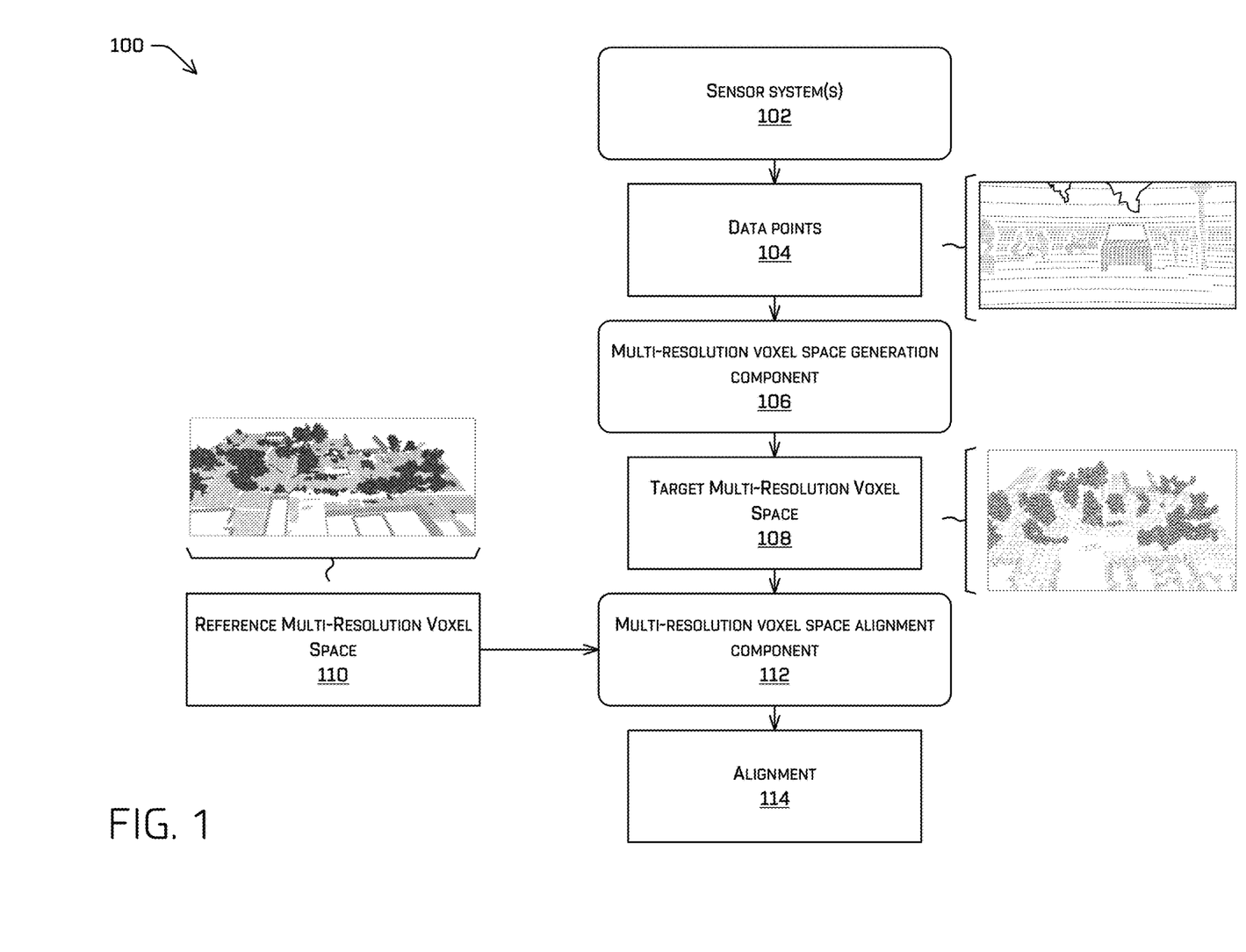
FIG. 1 is an example process flow diagram illustrating an example data flow of a system configured to align data representative of a physical environment with a scene, as described herein.

FIG. 1 is an example process flow diagram 100 illustrating an example data flow of a system configured to align data representative of a physical environment with a scene, as described herein. In the illustrated example, the system may be configured to store the scene as well as data representative of environment as multi-resolution voxel spaces. As discussed above, the multi-resolution voxel space may have a plurality of semantic layers in which each semantic layer comprises a plurality of voxel grids representing voxels as covariance ellipsoids at different resolutions.

In one particular example, a sensor system 102, such as a lidar, radar, sonar, infrared, camera, or other image capture device, may capture data representative the physical environment surrounding the system. In some cases, the captured data may be a plurality of data points 104, such as a point cloud generated from an output of a lidar scan. In this example, the data points 104 may be received by a multi-resolution voxel space component 106.

The multi-resolution voxel space component 106 may be configured to produce a target multi-resolution voxel space from the data points 104. In some cases, multi-resolution voxel space component 106 may process the data points via a classification and/or segmentation technique. For instance, the multi-resolution voxel space component 106 may assign types or classes to the data points using one or more neural networks (e.g., deep neural networks, convolutional neural networks, etc.), regression techniques, among others to identify and categorize the data points 104 with semantic labels. In some cases, the semantic labels may comprise a class or an entity type, such as vehicle, pedestrian, cyclist, animal, building, tree, road surface, curb, sidewalk, unknown, etc. In additional and/or alternative examples, the semantic labels may include one or more characteristics associated with data point 104. For example, characteristics may include, but are not limited to, an x-position (global and/or local position), a y-position (global and/or local position), a z-position (global and/or local position), an orientation (e.g., a roll, pitch, yaw), an entity type (e.g., a classification), etc.

In some examples, generating the target multi-resolution voxel space 108 may include filtering data associated with dynamic objects (e.g., representing pedestrians, vehicles, etc.) while associating data associated with static objects (e.g., buildings, trees, foliage, etc.) with the target multi-resolution voxel space 108. In an alternative implementation, the data points 104 may be output by a perception pipeline or component with the semantic labels attached. For instance, the data points 104 may be received as part of a sparse object state representation output by the perception component, details of which are discussed in U.S. application Ser. No. 16/549,694, which is herein incorporated by reference, in its entirety.

In the current example, the multi-resolution voxel space component 106 may assign the semantically labeled data points 104 to a semantic layer of the target multi-resolution voxel space 108 having a corresponding semantic label (e.g., tree, building, pedestrian, and the like). For instance, the multi-resolution voxel space component 106 may project the data points 104 into a common reference frame and then assigned to an appropriate point cloud associated with the corresponding semantic class. For each point cloud, the multi-resolution voxel space component 106 may then assign each data point 104 to a voxel of the finest resolution voxel grid (e.g., the base voxel grid) of each semantic layer. In some specific instances, the multi-resolution voxel space may be a single layer that stores multiple statistical values including a semantic class of each of the voxels.

Once each of the data points 104 for the corresponding cloud are assigned to a voxel, the multi-resolution voxel space generation component 106 may compute spatial statistics (e.g., a spatial mean, a covariance, a weight, and/or a number of data points 104 assigned to the voxel) for each voxel of the finest resolution grid of the semantic layer. Once the base or finest resolution voxel grid of a semantic layer is completed, the multi-resolution voxel space generation component 106 may iteratively or recursively generate each of the next coarser resolution voxel grids for each of the semantic layers. For instance, examples processes associated with generating voxel spaces are discussed in U.S. Pat. No. 11,288,861 and U.S. application Ser. No. 16/722,771, which are herein incorporated by reference, in their entirety and for all purposes.

Once the target multi-resolution voxel space 108 is generated from the data points 104, the target multi-resolution voxel space 108 may be aligned with a reference multi-resolution voxel space 110 (e.g., a prior generated multi-resolution voxel space representing the shared scene or physical environment). For instance, in the illustrated example, a multi-resolution voxel space alignment component 112 may generate an alignment 114 between the newly generated target multi-resolution voxel space 108 with the reference multi-resolution voxel space 110, for instance, to assist with localization, object tracking, and/or navigation of an autonomous vehicle with respect to the physical environment. In some cases, to generate the alignment 110 between the target multi-resolution voxel space 108 with the reference multi-resolution voxel space 110, the multi-resolution voxel space alignment component 112 may initially, select one or more coarse resolutions (e.g., resolutions above a size threshold) for individual semantic layers and begin determining an alignment or offset between voxels of the target multi-resolution voxel space 108 with the reference multi-resolution voxel space 110. In some examples, the multi-resolution voxel space alignment component 112 may utilize odometry, positions data, orientation data, trajectory data, or the like to determine an initial alignment from which to begin the alignment between the voxels of the target multi-resolution voxel space 108 with the reference multi-resolution voxel space 110.

The multi-resolution voxel space alignment component 112 may then, for instance, iteratively add the next finer resolution to the convergence process as the system determines an error of less than an error threshold. In some cases, the error threshold for the next finer resolution may be an average error of the voxels (e.g., a distance between centroids or otherwise as described herein) being less than or equal to half the size of a voxel of the current resolution (e.g., a width of an individual voxel used for alignment). In other examples, the error threshold for the next finer resolution may be an average error of the voxels is less than or equal to a quarter of the size of current finest resolution or the like.

In some examples, the multi-resolution voxel space alignment component 112 may continue to iterate stages of alignment until each of the resolutions has been added/used. In some cases, the multi-resolution voxel space alignment component 112 may continue to iterate after all of the resolutions have been added for a predetermined number of iterations (e.g., one iteration, two iterations, three iterations, five iterations, or the like) with all of the resolutions or until the average error is less than or equal to a final error threshold or until a change in the sum of residuals of the voxels less than or equal to a change threshold.

In some cases, the multi-resolution voxel space alignment component 112 may also during alignment rate, weight, or otherwise score eigenvalues of individual voxels and utilize the weight to select eigenvectors and/or voxels for use in the alignment 114. For example, as discussed above, the voxel may have a set of three or more eigenvalues and the multi-resolution voxel space component 106 may determine the score or weight the eigenvector or voxel based at least in part on any one of the one or more of the eigenvalues. In the current example, the smaller the eigenvalue may result in higher scores. In some implementations, the system may evaluate the individual eigenvalues against one or more predetermined heuristics or threshold to determine the weight. For example, the multi-resolution voxel space alignment component 112 may determine if one or more of the eigenvalues for a voxel is less than or equal to one or more threshold (such as a size threshold, error threshold, or the like) when generating the score. In some cases, the one or more thresholds may be relative to the size of the voxel or the size of the associated resolution. In other implementations, the multi-resolution voxel space alignment component 112 may utilize one or more machine learned models to evaluate and/or score the individual eigenvalues. The multi-resolution voxel space alignment component 112 may then select voxels associated with a higher score (e.g., based on number of points, eigenvalues, eigenvectors, etc.) for use in the alignment process. In some examples, the system may select eigenvalues that have the smallest values.

In some implementations, the multi-resolution voxel space alignment component 112 may also utilize the semantic class assigned to the voxel to fit or regress a quality or trust metric of the individual voxels. For instance, the multi-resolution voxel space alignment component 112 may generate and/or train a noise model to evaluate the quality of the voxels being aligned based at least in part on the eigenvalues of the voxel, the voxel resolution, a number of points associated with the voxel, and a semantic class of the voxel. The multi-resolution voxel space alignment component 112 may then utilize the quality or trust metric to select or weight voxels for use in the alignment process. In various examples, multiple multi-resolution voxel spaces may be generated for each such classification and the processes described herein may be run on any number of the varying classifications with a resultant transformation between the voxel spaces being combined. In at least some such examples, such combination may be based on, for example, covariances associated with the various classifications.

Figure 2:
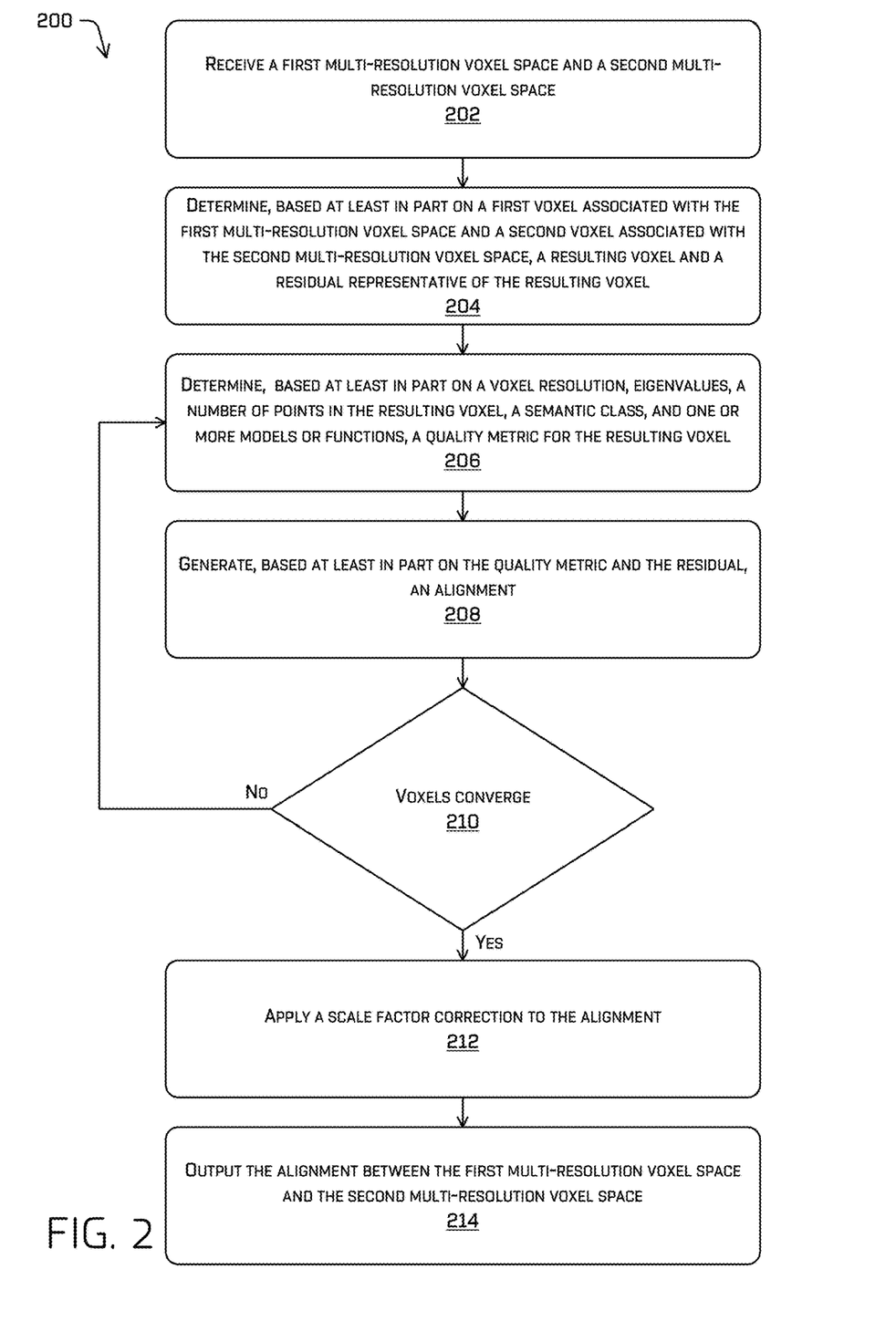
FIG. 2 is another flow diagram illustrating an example associated with generating alignments between a multi-resolution voxel spaces, as described herein.
Figure 3:
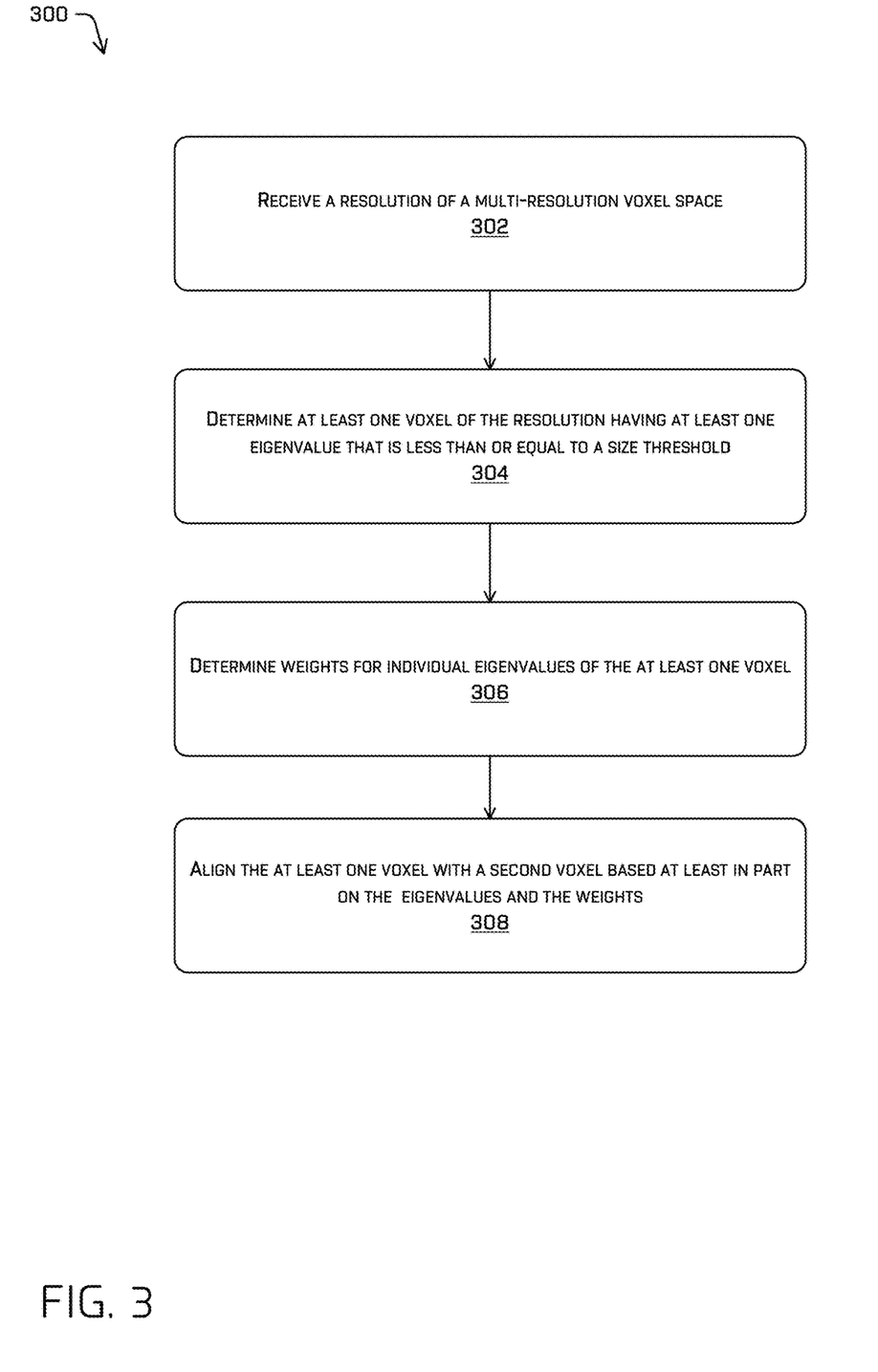
FIG. 3 is an example flow diagram illustrating an example process associated with generating alignments between a multi-resolution voxel spaces, as described herein.
Figure 4:
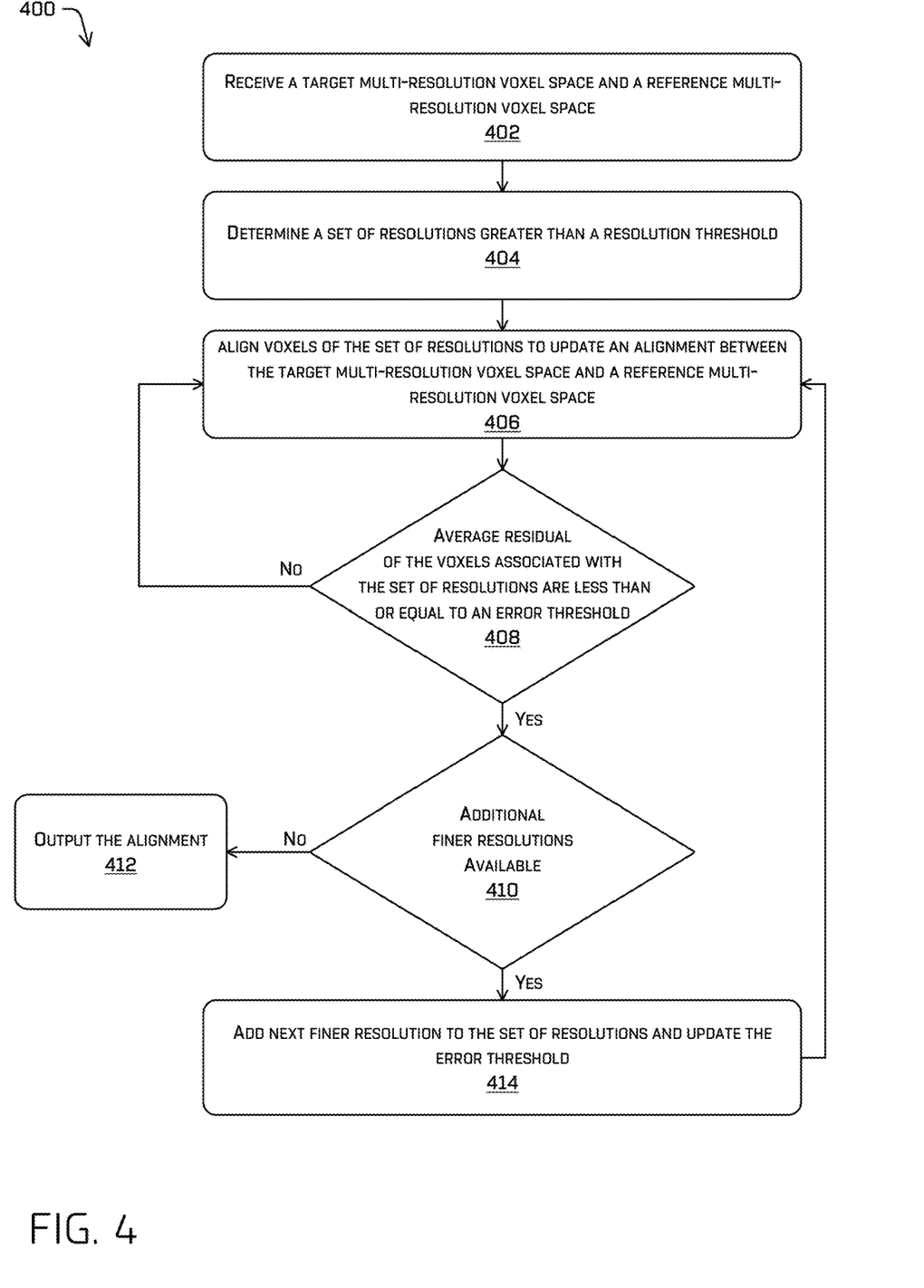
FIG. 4 is an example flow diagram illustrating an example process associated with generating alignments between a multi-resolution voxel spaces, as described herein.

FIGS. 2-4 are flow diagrams illustrating example processes associated with generating a multi-resolution voxel space as discussed herein. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 2 is another flow diagram illustrating an example process 200 associated with generating a multi-resolution voxel space, as described herein. As discussed above, a system may generate an alignment between a target multi-resolution voxel space representative of a physical environment and a reference multi-resolution voxel space representative of the same physical environment. In some cases, convergence between voxels of a target multi-resolution voxel space and voxels of a reference multi-resolution voxel space (e.g., generated from one or more prior scans of the physical environment) may be time and resource intensive. As discussed below, the process 200 reduces the time and resources required to achieve a convergence or a desired alignment between the two multi-resolution voxel spaces.

At 202, the system may receive a first multi-resolution voxel space and a second multi-resolution voxel space. For example, the system may receive two or more unaligned multi-resolution voxel spaces, such as a target and a reference. For example, the two or more multi-resolution voxel spaces may be generated from data captured as part of multiple spins of a lidar system, two or more vehicles capturing data representative of the same physical environment as discussed above.

At 204, the system may determine, based at least in part on a first voxel associated with the first multi-resolution voxel space and a second voxel associated with the second multi-resolution voxel space, a resulting voxel and a residual representative of the resulting voxel. For example, for a pair of associated voxels (e.g., having closest centroids), the system may determine various metrics corresponding to a combination of all associated points (e.g., a mean, number of points, covariance, eigenvalues, eigenvectors, etc.), a vector or distance between the means of the first voxel and second voxel, and the like. In at least some examples, a residual associated with the alignment of the first and second voxels may be determined a dot product between the vector between the means of the first voxel and second voxel and individual eigenvalues (such as the smallest eigenvalue). In other words, the residual may be equal to a dot product of the unit vector of an eigenvector of the combined voxel and a result of the first mean minus the second mean.

At 206, the system may determine a quality metric for a resulting voxel based at least in part on a voxel resolution, eigenvalues, a number of points in the voxel, a semantic class, and one or more models. For example, a first voxel layer of a resolution may be associated with buildings, a second voxel layer of the same resolution may be associated with a ground plane, and/or a third voxel layer of the same resolution may be associated with vegetation. In this example, the system may utilize the semantic class assigned to the resulting voxel to fit or regress a quality or trust metric of the individual voxel matches within the voxel layer. For instance, the system may input, for each voxel, the voxel resolution of the resulting voxel, eigenvalues of the resulting voxel, a number of points in the resulting voxel, and the semantic class of the resulting voxel into a machine learned model or other predated that will output the quality metric. For instance, the system may generate and/or train a noise model to evaluate the quality of the voxel matches based at least in part on the eigenvalues of the voxel, the resolution, a number of points associated with the voxel, and the semantic class. In other cases, the system may utilize a predetermined function whose result or output is the quality metric. In these cases, the function may also receive as an input the voxel resolution of the resulting voxel, eigenvalues of the resulting voxel, a number of points in the resulting voxel, and the semantic class of the resulting voxel.

At 208, the system may generate, based at least in part on the quality metric and the residual, an alignment between the first multi-resolution voxel space and the second multi-resolution voxel space. For example, the system may scale or weight the pairs of voxels (e.g., the residual) based at least in part on the quality metric. In some examples, the system may compare the quality metric to an expected error and utilize residuals of voxel pairs having a quality metric less than or equal to the expected error to generate the alignment. In some examples, the residual may be scaled based at least in part on the quality metric. In such examples, those pairs associated with a lower quality metric will be less heavily relied upon as compared to other pairs with higher quality metrics. In various examples, such a quality metric may be a number between 0 and 1.

At 210, the system may determine if the voxels have converged. For example, the system may iterate until convergence is less than or equal to a distance threshold, a number of iterations, steps, or levels are performed, and/or a change in the residual between the prior iteration and the current iteration is less than or equal to a residual threshold. As one illustrative example, convergence may be achieved when an error represented by a vector between the means of pairs of voxels in the target multi-resolution voxel space and the refence multi-resolution voxel space is less than an error threshold. If the voxels have not converged, the process 200 may return to 204. Otherwise, once the voxels have converged, the process 200 may advance to 212.

At 212, the system may apply a scale factor correction to the alignment. For example, the system may determine a scale factor correction for the alignment, by random sampling the residuals (such as Monte Carlo technique) of the voxels. The system may then apply the scale factor correction to one or more of the alignment and, at 214, output the alignment.

FIG. 3 is an example flow diagram illustrating an example process 200 associated with aligning multi-resolution voxel spaces, as described herein. As discussed above, a system may generate an alignment between a target multi-resolution voxel space representative of a physical environment and a reference multi-resolution voxel space. In some cases, convergence between voxels of a target multi-resolution voxel space and voxels of a reference multi-resolution voxel space (e.g., generated from one or more prior scans of the physical environment) may be time and resource intensive. As discussed below, the process 200 reduces the time and resources required to achieve a convergence or a desired alignment between the two multi-resolution voxel spaces.

At 302, the system may receive a resolution of a multi-resolution voxel space. For example, the system may per semantic layer and per resolution evaluate or select eigenvalues of voxels for use in an alignment process. As discussed above, individual voxels may include three eigenvectors representative, or providing the physical shape, of the corresponding data associated with the particular voxel. These eigenvectors may be used to determine if a voxel is suitable or preferable for use in the alignment process.

At 304, the system may determine at least one voxel of the resolution having at least one eigenvalue that is less than or equal to a threshold, which may be related to the size of the voxel (e.g., in any dimension). For example, for each eigenvalue that is greater than the size threshold, the system may determine that the data in the direction represented by the eigenvalue should not be relied upon. However, rather than discard the entire voxel, the system may determine the usability based on each individual direction (e.g., eigenvalue). Accordingly, if the voxel has three eigenvalues greater than the size threshold, the entire voxel may be disregarded for the alignment process and/or for a current iteration of the alignment process. In some cases, the size threshold may be based on a resolution associated with the voxel, a predetermined value, a classification of the associated points, or the like.

At 306, the system may associate weights with individual voxels to assist with selecting voxels and/or eigenvalues that will provide the usable data generating an alignment. For example, the system may assign a weight between zero and one in which a value greater than or equal to a first size threshold may be a zero and a value less than or equal to a second size threshold value would be assigned a weight of one. Values between the first size threshold and second size threshold would be assigned a weight between zero and one, such as 0.3, 0.5, 0.7, and the like.

At 308, the system may align the at least one voxel with a second voxel based at least in part on the eigenvalues and/or the weights. For example, the system may select the at least one voxel based on the weight. However, the system may only utilize two of the three eigenvalues of the voxel as inputs to the alignment process based on the individual weights of each individual eigenvalue. For instance, if a voxel has two eigenvalues equal to one and a single eigenvalue having a weight of zero, the system may disregard the single eigenvalue while determining the alignment. In other examples, the system may utilize one or three of the eigenvalues as inputs to the alignment process. In this manner, voxels may be merged or aligned using higher quality eigenvectors and/or eigenvalues.

FIG. 4 is an example flow diagram illustrating an example process 400 associated with generating a multi-resolution voxel space, as described herein. As discussed above, a system may generate an alignment between two multi-resolution voxel spaces representative of a physical environment. In some cases, convergence of the alignment between voxels of a target multi-resolution voxel space (e.g., generated from, for instance, a current scan of the physical environment) and voxels of a reference multi-resolution voxel space (e.g., a prior generated map of the physical environment) may be time and resource intensive. As discussed below, the process 400 reduces the time and resources required to achieve a convergence of an alignment between the two multi-resolution voxel spaces (such as the target multi-resolution voxel space and the reference multi-resolution voxel space).

At 402, the system may receive a target multi-resolution voxel space and a reference multi-resolution voxel space. As discussed herein, the target multi-resolution voxel space may be generated from data captured by an autonomous vehicle operating within the physical environment. For instance, the autonomous vehicle may capture and/or generate data representative of a physical environment using various sensors associated with the vehicle. In some cases, the sensor data may include image data, lidar data, point cloud data, environmental data, radar data, sonar data, infrared data, and the like. The system may generate semantic point cloud data from the data representative of a physical environment, e.g., wherein a semantic classification is associated with the various points and classes are segregated. For example, the system may segment and classify the data representative of a physical environment. For example, the system may utilize one or more machine learned models to segment and classify the data representative of a physical environment. In some cases, the segmented and classified data may be stored or organized into semantic layers (e.g., each layer includes data corresponding to the assigned class). For instance, in one specific example, assignment of semantic classes to data points is discussed in U.S. application Ser. No. 15/820,245, which is herein incorporated by reference, in its entirety. In some examples, the system may generate per semantic class voxel covariance grids at multiple resolutions for at least a portion (including all) semantic classes. For example, for each semantic layer, the system may generate voxels at one or more resolutions (e.g., each resolution may have voxels of differing physical sizes). In some cases, the size of the resolution may be based on a power of two, such as 25 centimeters, 1 meter, 16 meters, 25 meters, or the like. The reference multi-resolution voxel space may be previously generated from prior scans or data captured of the physical environment and provided as a map of the physical environment usable by the autonomous vehicle in operational decisions and processes. For instance, in one specific example of generating multi-resolution voxel spaces is discussed in U.S. application Ser. No. 17/446,344, which is herein incorporated by reference, in its entirety.

At 404, the system may determine a set of resolutions greater than a resolution threshold. For example, the system may initiate the alignment process by limiting the resolutions at which the voxels will be processed to one or more coarse resolution. For instance, the system my limited the resolutions to resolutions of greater than or equal to 25 meters or 16 meters, or the like. In some examples, the set of resolutions may be a single coarsest resolution.

At 406, the system may align voxels of the set of resolutions to update an alignment between the target multi-resolution voxel space and the reference multi-resolution voxel space. For example, the system may allow voxels of the set of resolutions to aligned based at least in part on the voxel covariances, as discussed above with respect to FIGS. 2 and 3. In this manner, as only coarse resolutions used to generate the alignment to within a predetermined error threshold, the system and process 400 allows for improved efficiencies associated with the generation of the alignment and improved (e.g., faster with fewer resources consumed) convergence with regards to finer resolutions.

As a non-limiting illustrative example, the system may generate an alignment from pairs of voxels (e.g., corresponding voxels of the target and reference multi-resolution voxel space). In some cases, the alignment may be generated by determining a match residual between two voxels (e.g., one from each space) of the same semantic class. For example, the system may determine a mean of the first voxel (the voxel of the target space) and a second voxel (the voxel of the reference space) and determine a vector between the means of the first voxel and the second voxel.

The system may also generate a resulting voxel (such as via a statistical analysis or summing the two voxel) and, based at least in part on the mean of the resulting voxel and the vector, the system may determine eigenvalues for the pair of voxels. The system may then select either the smallest eigenvalue or each eigenvalue less than or equal to a threshold (as the longer the eigenvalue the greater the error and the less accurate representee information is) and utilizing the selected eigenvalue and the vector (such as a dot product) to generate a scaler value or residual. In this example, the residual may represent the error between the first voxel and the second voxel in the direction of the eigenvalue/eigenvector. In this example, it should be understood that the residual may be computed for each of the three eigenvalues resulting in three residuals representing error in three directions that may be used to align the pair of voxels and, thereby, assist in generating the alignment between the target multi-resolution voxel space and the reference multi-resolution voxel space.

The system may then compare the residuals to an expected error determined as an output of a predetermined function that utilizes the number of points in the voxels, the semantic class of the voxels, the resolution of the voxels, and the eigenvalues, as discussed above with respect to FIG. 3. In this example, if the residuals are less than or equal to the expected error then the system may determine a rotation and translation (such as via a least squares operation) between the first voxel and the second voxel which are utilized to update the alignment.

At 408, the system may determine if an average residual of the voxels associated with the set of resolutions are less than or equal to an error threshold. In some cases, the error threshold may be half the size of the finest resolution within the set of resolutions. For example, if the finest resolution of the set of resolutions was 25 meters, the system may then iteratively perform alignment steps until the average residual is less than 12.5 meters. In other examples, the error threshold for the next finer resolution may be an average residual of less than or equal to a quarter of the size of current finest resolution or the like.

If the average residual of the voxels is not less than or equal to the error threshold, the process 400 returns to 406 and preforms another iteration to improve the alignment by continuing to align the voxels of the set of resolutions. However, if the average residual of the voxels is less than or equal to the error threshold, the process 400 advances to 410.

At 410, the system may determine if additional finer resolutions are available. If there are no more resolutions available, the system, at 412, may output the alignment between the target multi-resolution voxel space and the reference multi-resolution voxel space. In some examples, it should be understood that the process 400 may preform one or more iteration of step 406 (such as until a final error threshold is met or exceed and/or a predetermined number of iterations have resolved) once the finest resolution is added of the set of resolutions.

Otherwise, the process 400 proceeds to 414. At 414, the system may add the next finer resolution to the set of resolutions and update the error threshold. For example, the error threshold may be reduced to a value proportional to the size of the next finer resolution (e.g., half of the size of the next finer resolution). Once the next finer resolution is added to the set of resolutions and the error threshold is updated, the process 400 may return to 410 and the system may again aligns voxels of the set of resolutions, as discussed above.

Figure 5:
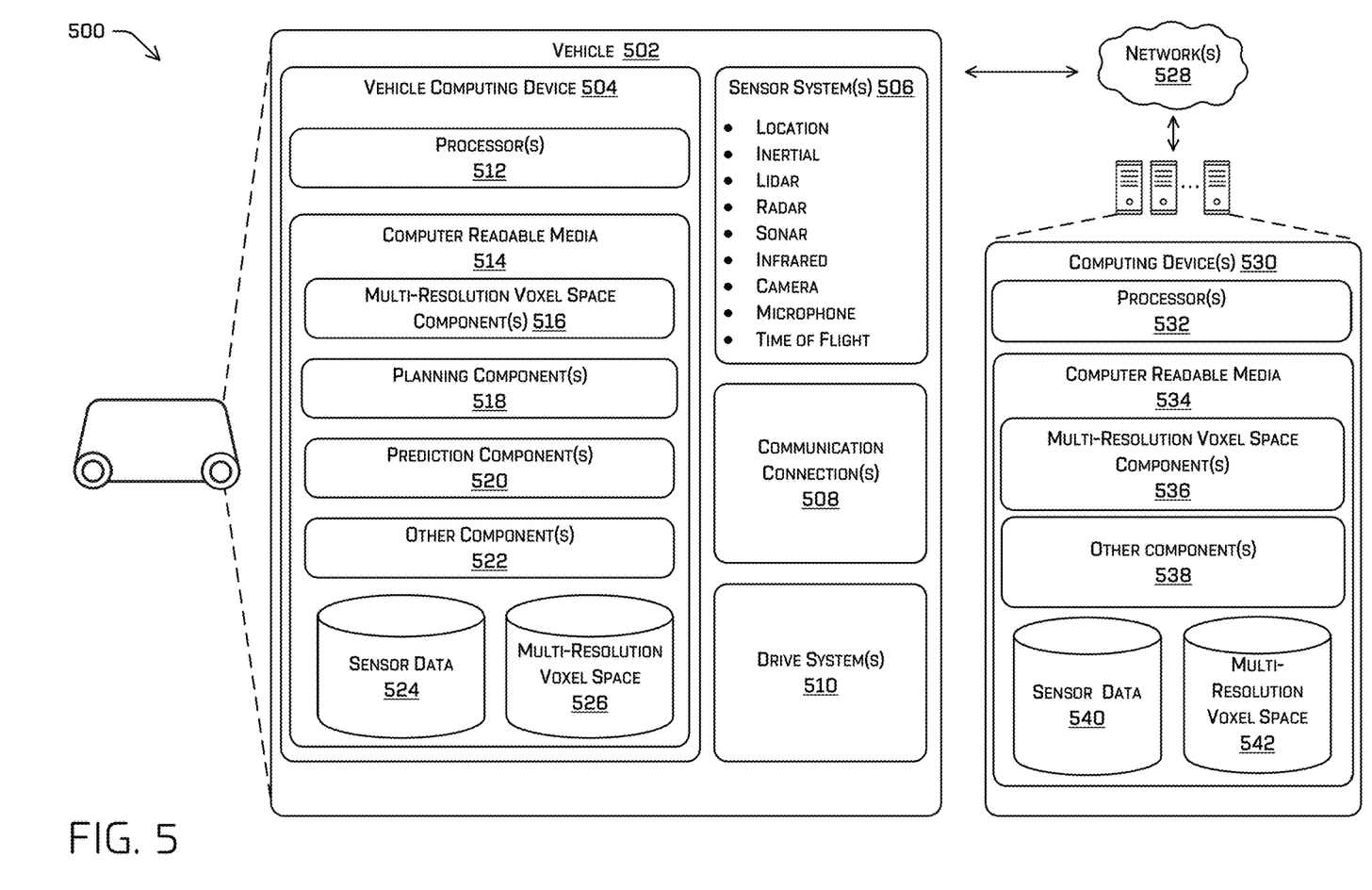
FIG. 5 is a block diagram of an example system for implementing the multi-resolution voxel space alignment system, as described herein.

FIG. 5 is a block diagram of an example system 500 for implementing the multi-resolution voxel space alignment system, as described herein. In this embodiment, the system 500 is an autonomous vehicle 502 that may include a vehicle computing device 504, one or more sensor systems 506, one or more communication connections 508, and one or more drive systems 510.

The vehicle computing device 504 may include one or more processors 512 (or processing resources) and computer readable media 514 communicatively coupled with the one or more processors 512. In the illustrated example, the vehicle 502 is an autonomous vehicle; however, the vehicle 502 could be any other type of vehicle, or any other system (e.g., a robotic system, a camera enabled smartphone, etc.). In the illustrated example, the computer readable media 514 of the vehicle computing device 504 stores multi-resolution voxel space components 516, planning components 518, prediction components 520, as well as other components 522 associated with an autonomous vehicle. The computer readable media 514 may also store sensor data 524 and multi-resolution voxel spaces 526. In some implementations, it should be understood that the systems as well as data stored on the computer readable media may additionally, or alternatively, be accessible to the vehicle 502 (e.g., stored on, or otherwise accessible by, other computer readable media remote from the vehicle 502).

The multi-resolution voxel space generation components 516 may generate multi-resolution voxel spaces as discussed above and the multi-resolution voxel space components 516 may output alignments between two or more multi-resolution voxel spaces as discussed above.

In some implementations, the prediction components 520 may be configured to estimate current, and/or predict future, characteristics or states of objects (e.g., vehicles, pedestrians, animals, etc.), such as pose, speed, trajectory, velocity, yaw, yaw rate, roll, roll rate, pitch, pitch rate, position, acceleration, or other characteristics, based at least in part on the multi-resolution voxel spaces 526 output by the multi-resolution voxel space components 516.

The vehicle 502 can also include one or more communication connection(s) 508 that enable communication between the vehicle 502 and one or more other local or remote computing device(s). For instance, the communication connection(s) 508 may facilitate communication with other local computing device(s) on the vehicle 502 and/or the drive system(s) 510. Also, the communication connection(s) 508 may allow the vehicle 502 to communicate with other nearby computing device(s) (e.g., other nearby vehicles, traffic signals, etc.). The communications connection(s) 508 may also enable the vehicle 502 to communicate with remote teleoperations computing device or other remote services.

The communications connection(s) 508 may include physical and/or logical interfaces for connecting the vehicle computing device 504 to another computing device (e.g., computing device(s) 530) and/or a network, such as network(s) 528. For example, the communications connection(s) 508 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some examples, the communication connections 508 of the vehicle 502 may transmit or send the multi-resolution voxel spaces 526 to the computing device(s) 530.

In at least one example, the sensor system(s) 506 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), and one or more time of flight (ToF) sensors, etc. The sensor system(s) 506 can include multiple instances of each of these or other types of sensors. For instance, the lidar sensors may include individual lidar sensors located at the corners, front, back, sides, and/or top of the vehicle 502. As another example, the camera sensors can include multiple cameras disposed at various locations about the exterior and/or interior of the vehicle 502. The sensor system(s) 506 may provide input to the vehicle computing device 504. Additionally, or alternatively, the sensor system(s) 506 can send sensor data, via the one or more networks 528, to the one or more computing device(s) 530 at a particular frequency, after a lapse of a predetermined period of time, in near real-time, etc.

In at least one example, the vehicle 502 can include one or more drive systems 510. In some examples, the vehicle 502 may have a single drive system 510. In at least one example, if the vehicle 502 has multiple drive systems 510, individual drive systems 510 can be positioned on opposite ends of the vehicle 502 (e.g., the front and the rear, etc.). In at least one example, the drive system(s) 510 can include one or more sensor systems 506 to detect conditions of the drive system(s) 510 and/or the surroundings of the vehicle 502, as discussed above. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 510. In some cases, the sensor system(s) 506 on the drive system(s) 510 can overlap or supplement corresponding systems of the vehicle 502.

In at least one example, the components discussed herein can process sensor data 524, as described above, and may send their respective outputs, over the one or more network(s) 528, to one or more computing device(s) 530. In at least one example, the components discussed herein may send their respective outputs to the one or more computing device(s) 530 at a particular frequency, after a lapse of a predetermined period of time, in near real-time, etc.

In some examples, the vehicle 502 can send sensor data to one or more computing device(s) 530 via the network(s) 528. In some examples, the vehicle 502 can send raw sensor data 524 or processed multi-resolution voxel spaces 526 to the computing device(s) 530. In other examples, the vehicle 502 can send processed sensor data 524 and/or representations of sensor data (for instance, the object perception tracks) to the computing device(s) 530. In some examples, the vehicle 502 can send sensor data 524 to the computing device(s) 530 at a particular frequency, after a lapse of a predetermined period of time, in near real-time, etc. In some cases, the vehicle 502 can send sensor data (raw or processed) to the computing device(s) 530.

The computing system(s) 530 may include processor(s) 532 and computer readable media 534 storing multi-resolution voxel space components 536, as well as other components 538, sensor data 540 and multi-resolution voxel spaces 542 received from the vehicle 502. In some examples, the multi-resolution voxel space components 536 may be configured to generate multi-resolution voxel spaces 542 or align multi-resolution voxel spaces 542 generated from data captured by multiple vehicles 502 to form more complete scenes of various physical environments and/or connect various scenes together as a signal extended physical environment. In some cases, the multi-resolution voxel space components 536 may be configured to generate one or more models from the sensor data 524 that may be used for machine learning and/or future code testing.

The processor(s) 512 of the vehicle 502 and the processor(s) 532 of the computing device(s) 530 may be any suitable processor capable of executing instructions to process data and perform operations as described herein. By way of example and not limitation, the processor(s) 512 and 532 can comprise one or more Central Processing Units (CPUs), Graphics Processing Units (GPUs), or any other device or portion of a device that processes electronic data to transform that electronic data into other electronic data that can be stored in registers and/or computer readable media. In some examples, integrated circuits (e.g., ASICs, etc.), gate arrays (e.g., FPGAs, etc.), and other hardware devices can also be considered processors in so far as they are configured to implement encoded instructions.

Computer readable media 514 and 534 are examples of non-transitory computer-readable media. The computer readable media 514 and 534 can store an operating system and one or more software applications, instructions, programs, and/or data to implement the methods described herein and the functions attributed to the various systems. In various implementations, the computer readable media can be implemented using any suitable computer readable media technology, such as static random-access memory (SRAM), synchronous dynamic RAM (SDRAM), nonvolatile/Flash-type memory, or any other type of computer readable media capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component.

It should be noted that while FIG. 5 is illustrated as a distributed system, in alternative examples, components of the vehicle 502 can be associated with the computing device(s) 530 and/or components of the computing device(s) 530 can be associated with the vehicle 502. That is, the vehicle 502 can perform one or more of the functions associated with the computing device(s) 530, and vice versa.

Figure 6:
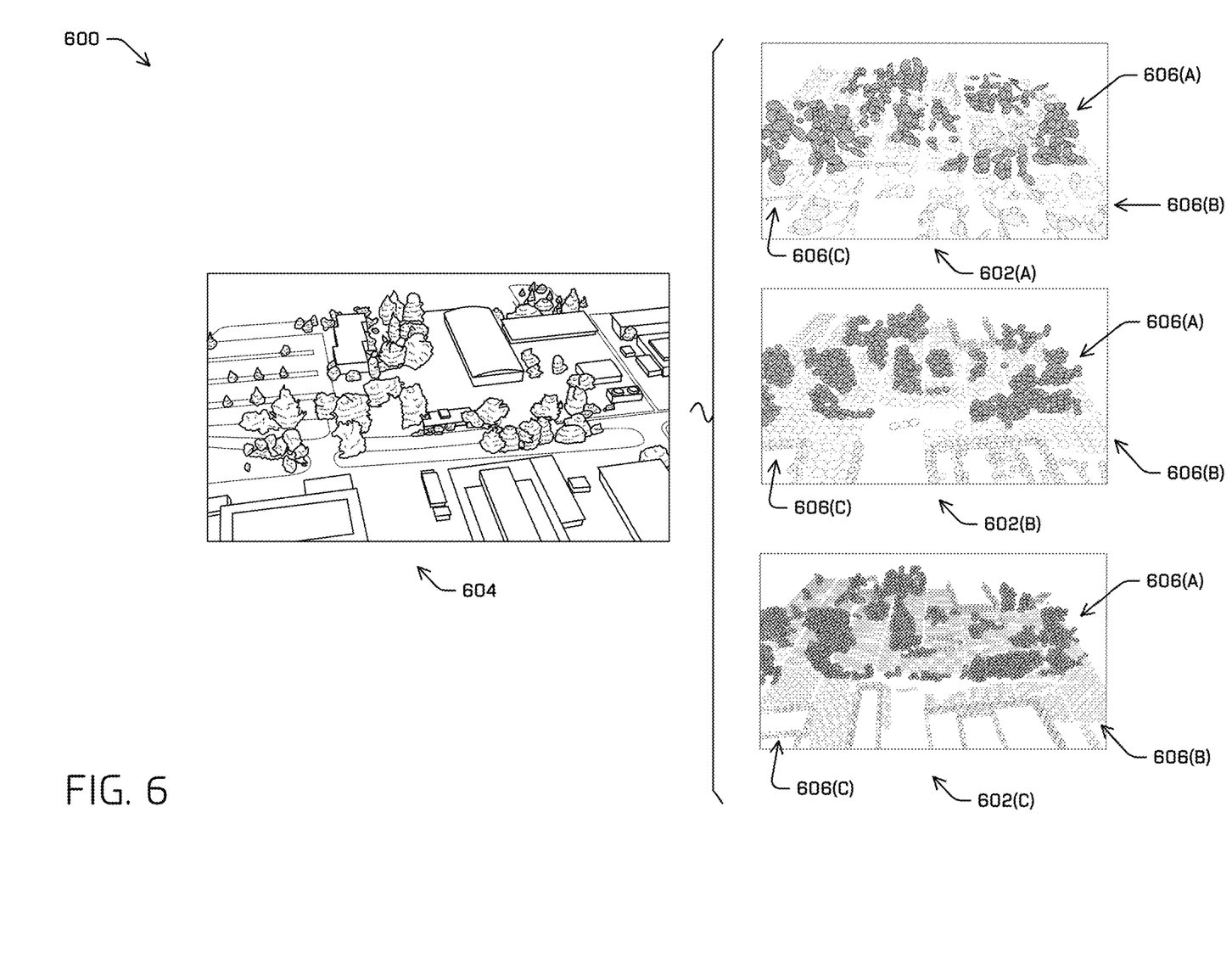
FIG. 6 is a pictorial diagram of an example of the multi-resolution voxel space, as described herein.

FIG. 6 is a pictorial diagram 600 of an example resolution of the multi-resolution voxel space 602, in comparison with a representation 604 of the captured data, as described herein. In this example, the multi-resolution voxel space 602 includes multiple layers or resolutions, generally indicated by 602(A)-(C), semantic layers, generally indicated by 606 (A)-(C). For instance, in this example, the voxels of layer 606(A) correspond to foliage and are represented as shaded voxels having a dark outline, the voxels of layer 606(B) correspond to ground planes and are represented as unshaded voxels having a light outline, and the voxels of layer 606(C) correspond to buildings and stationary objects and are represented as unshaded voxels having a dark outline. As illustrated, both the multi-resolution voxel space 602 and the representation 604 correspond to a real-world physical location or space.

Example Clauses

A. A system comprising: one or more processors; and one or more non-transitory computer readable media storing instructions executable by the one or more processors, wherein the instructions, when executed, cause the system to perform operations comprising: receiving a target multi-resolution voxel space, the target multi-resolution voxel space comprising a first plurality of voxels representative of discrete volumetric portions of a physical environment and defined by a first resolution and a second resolution, the first resolution being coarser than the second resolution; receiving a reference multi-resolution voxel space, the reference multi-resolution voxel space comprising a second plurality of voxels representative of discrete volumetric portions of the physical environment and defined by the first resolution and the second resolution; determining a first resulting voxel based at least in part on a first voxel of the first resolution of the target multi-resolution voxel space and a second voxel of the of the first resolution of the reference multi-resolution voxel space; determining a first quality metric of the first resulting voxel based at least in part on one or more of a number of points associated with the first resulting voxel, a semantic class associated with the first resulting voxel, an eigenvalue associated with the first resulting voxel, or the first resolution; determining, based at least in part on the first resulting voxel, a first residual; determining, based at least in part on the first quality metric and the first residual, an alignment between the target and reference multi-resolution voxel spaces; and performing, based at least in part on the alignment, an operation of an autonomous vehicle.

B. The system of claim A, wherein the operations further comprise responsive to determining that an average residual of the alignment is less than or equal to an error threshold: determining a second resulting voxel based at least in part on a third voxel of the second resolution of the target multi-resolution voxel space and a fourth voxel of the of the second resolution of the reference multi-resolution voxel space; determining a second quality metric of the second resulting voxel based at least in part on one or more of a number of points associated with the second resulting voxel, a semantic class associated with the second resulting voxel, an eigenvalue associated with the second resulting voxel, or the second resolution; determining, based at least in part on the second resulting voxel, a second residual; determining, based at least in part on the second quality metric and the second residual, a final alignment; and performing the operation of the autonomous vehicle is based at least in part on the final alignment.

C. The system of claim A, wherein the first voxel and the second voxel are determined based on having a minimum distance between centroids.

D. The system of claim A, wherein determining the alignment further comprises scaling the first residual by the first quality metric.

E. The system of claim A, wherein determining the first residual comprises determining a set of data associated with the first voxel and the second voxel; determining an eigenvector of the set of data; determining a vector between the mean of data associated with the first voxel and a mean of data associated with the second voxel; and determining, as the residual, a dot product between the eigenvector and the vector.

F. The system of claim A, wherein the first voxel comprises a first eigenvalue, a second eigenvalue, and a third eigenvalue and the operations further comprise determining at least one of the first eigenvalue, the second eigenvalue, or the third eigenvalue is less than or equal to a size threshold; determining, based at least in part on a size of the first eigenvalue, a first weight; determining, based at least in part on a size of the second eigenvalue, a second weight; determining, based at least in part on a size of the third eigenvalue, a third weight; and applying the first weight to the first eigenvalue, the second weight to the second eigenvalue, and the third weight to the third eigenvalue prior to determining the first resulting voxel.

G. One or more non-transitory computer-readable media storing instructions that, when executed, cause one or more processors to perform operations comprising: determining a quality metric of a voxel associated with a first multi-resolution voxel space and a second multi-resolution voxel space based at least in part on one or more of a number of points associated with the voxel, a semantic class associated with the voxel, an eigenvalue associated with the voxel, or a resolution associated with the voxel; determining a residual associated with the voxel; and determining, based at least in part on the quality metric and the residual, an alignment between the first multi-resolution voxel space and the second multi-resolution voxel space.

H. The non-transitory computer-readable medium of paragraph G, wherein the first multi-resolution voxel space comprises a first plurality of voxels representative of discrete volumetric portions of a physical environment and defined by a first resolution and a second resolution, the first resolution being coarser than the second resolution; and the second multi-resolution voxel space comprises a second plurality of voxels representative of discrete volumetric portions of the physical environment and defined by the first resolution and the second resolution; and the resolution is the first resolution.

I. The non-transitory computer-readable medium of paragraph H, wherein the voxel is a first voxel and associated with the first resolution; and the operations further comprise: responsive to determining that an average residual of the alignment is less than or equal to a threshold: determining a second quality metric of a second voxel associated with the first multi-resolution voxel space and the second multi-resolution voxel space based at least in part on one or more of a number of points associated with the second voxel, a semantic class associated with the second voxel, an eigenvalue associated with the second voxel, or a resolution associated with the voxel, the second voxel of the second resolution; determining a second residual associated with the second voxel; and generating, based at least in part on the second quality metric, the second residual, and the alignment, an updated alignment.

J. The non-transitory computer-readable medium of paragraph I, comprising one or more of controlling a vehicle based at least in part on the updated alignment, or creating a map based at least in part on the updated alignment.

K. The non-transitory computer-readable medium of paragraph G, wherein the voxel is a statical combination of first data associated with a voxel of the first multi-resolution voxel space and second data associated with a voxel of the second multi-resolution voxel space.

L. The non-transitory computer-readable medium of paragraph K, wherein determining the residual further comprises determining a dot product of an eigenvector of the voxel and vector indicative of a separation between a voxel of the first multi-resolution voxel space and a voxel of the second multi-resolution voxel space.

M. The non-transitory computer-readable medium of paragraph G, wherein the voxel is a first voxel and determining the first residual comprises: determining a set of data associated with the first voxel and a second voxel; determining an eigenvector of the set of data; determining a vector between the mean of data associated with the first voxel and a mean of data associated with the second voxel; and determining, as the residual, a dot product between the eigenvector and the vector.

N. A method comprising: determining a quality metric of a voxel associated with a first multi-resolution voxel space and a second multi-resolution voxel space based at least in part on one or more of a number of points associated with the voxel, a semantic class associated with the voxel, an eigenvalue associated with the voxel, or a resolution associated with the voxel; determining a residual associated with the voxel; and determining, based at least in part on the quality metric and the residual, an alignment between the first multi-resolution voxel space and the second multi-resolution voxel space.

O. The method of paragraph N, wherein: the first multi-resolution voxel space comprises a first plurality of voxels representative of discrete volumetric portions of a physical environment and defined by a first resolution and a second resolution, the first resolution being coarser than the second resolution; and the second multi-resolution voxel space comprises a second plurality of voxels representative of discrete volumetric portions of the physical environment and defined by the first resolution and the second resolution; and the resolution is the first resolution.

P. The method of paragraph N, wherein: the voxel is a first voxel and associated with the first resolution; and the method further comprise: responsive to determining that an average residual of the alignment is less than or equal to a threshold: determining a second quality metric of a second voxel associated with the first multi-resolution voxel space and the second multi-resolution voxel space based at least in part on one or more of a number of points associated with the second voxel, a semantic class associated with the second voxel, an eigenvalue associated with the second voxel, or a resolution associated with the voxel, the second voxel of the second resolution; determining a second residual associated with the second voxel; and generating, based at least in part on the second quality metric, the second residual, and the alignment, an updated alignment.

Q. The method of paragraph P, further comprising outputting the updated alignment responsive to determining the updated alignment achieving or exceeding a convergence threshold.

R. The method of paragraph P, wherein the voxel is a statical combination of first data associated with a voxel of the first multi-resolution voxel space and second data associated with a voxel of the second multi-resolution voxel space.

S. The method of paragraph R, wherein determining the residual further comprises determining a dot product of a unit vector of the voxel and a mean of the voxel of the first multi-resolution voxel space minus a mean of the voxel of the second multi-resolution voxel space.

T. The method of paragraph N, wherein the operations further comprise performing, based at least in part on the alignment, an operation of an autonomous vehicle.

While the example clauses described above are described with respect to one particular implementation, it should be understood that, in the context of this document, the content of the example clauses can also be implemented via a method, device, system, a computer-readable medium, and/or another implementation. Additionally, any of the examples A-T may be implemented alone or in combination with any other one or more of the examples A-T.

CONCLUSION

As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples. For example, the components and instructions of FIG. 5 may utilize the processes and flows of FIGS. 1-4.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

The invention claimed is:

1. A system comprising:
one or more processors; and
one or more non-transitory computer readable media storing instructions executable by the one or more processors, wherein the instructions, when executed, cause the system to perform operations comprising:
receiving a target multi-resolution voxel space, the target multi-resolution voxel space comprising a first plurality of voxels representative of discrete volumetric portions of a physical environment and defined by a first resolution and a second resolution, the first resolution being coarser than the second resolution;
receiving a reference multi-resolution voxel space, the reference multi-resolution voxel space comprising a second plurality of voxels representative of discrete volumetric portions of the physical environment and defined by the first resolution and the second resolution;
determining a first resulting voxel based at least in part on a first voxel of the first resolution of the target multi-resolution voxel space and a second voxel of the of the first resolution of the reference multi-resolution voxel space;
determining a first quality metric of the first resulting voxel based at least in part on one or more of a number of points associated with the first resulting voxel, a semantic class associated with the first resulting voxel, an eigenvalue associated with the first resulting voxel, or the first resolution;
determining, based at least in part on the first resulting voxel, a first residual;
determining, based at least in part on the first quality metric and the first residual, an alignment between the target multi-resolution voxel space and the reference multi-resolution voxel space; and
determining, based at least in part on the alignment, map data characterizing the physical environment,
wherein an autonomous vehicle is localized in the physical environment based at least in part on the map data.

2. The system of claim 1, wherein:
the operations further comprise:
responsive to determining that an average residual of the alignment is less than or equal to an error threshold:
determining a second resulting voxel based at least in part on a third voxel of the second resolution of the target multi-resolution voxel space and a fourth voxel of the of the second resolution of the reference multi-resolution voxel space;
determining a second quality metric of the second resulting voxel based at least in part on one or more of a number of points associated with the second resulting voxel, a semantic class associated with the second resulting voxel, an eigenvalue associated with the second resulting voxel, or the second resolution;
determining, based at least in part on the second resulting voxel, a second residual; and
determining, based at least in part on the second quality metric and the second residual, a final alignment,
wherein determining the map data is based at least in part on the final alignment.

3. The system of claim 1, wherein the first voxel and the second voxel are determined based on having a minimum distance between centroids.

4. The system of claim 1, wherein determining the alignment further comprises scaling the first residual by the first quality metric.

5. The system of claim 1, wherein determining the first residual comprises:
determining a set of data associated with the first voxel and the second voxel;
determining an eigenvector of the set of data;
determining a vector between the mean of data associated with the first voxel and a mean of data associated with the second voxel; and
determining, as the first residual, a dot product between the eigenvector and the vector.

6. The system of claim 1, wherein the first voxel comprises a first eigenvalue, a second eigenvalue, and a third eigenvalue and the operations further comprise:
determining at least one of the first eigenvalue, the second eigenvalue, or the third eigenvalue is less than or equal to a size threshold;
determining, based at least in part on a size of the first eigenvalue, a first weight;

determining, based at least in part on a size of the second eigenvalue, a second weight;

determining, based at least in part on a size of the third eigenvalue, a third weight; and applying the first weight to the first eigenvalue, the second weight to the second eigenvalue, and the third weight to the third eigenvalue prior to determining the first resulting voxel.

7. One or more non-transitory computer-readable media storing instructions that, when executed, cause one or more processors to perform operations comprising:

determining a quality metric of a voxel associated with a first multi-resolution voxel space and a second multi-resolution voxel space based at least in part on one or more of a number of points associated with the voxel, a semantic class associated with the voxel, an eigenvalue associated with the voxel, or a resolution associated with the voxel;

determining a residual associated with the voxel;

determining, based at least in part on the quality metric and the residual, an alignment between the first multi-resolution voxel space and the second multi-resolution voxel space; and determining, based at least in part on the alignment, map data characterizing a physical environment, wherein an autonomous vehicle is localized in the physical environment based at least in part on the map data.

8. The one or more non-transitory computer-readable media of claim 7, wherein:

the first multi-resolution voxel space comprises a first plurality of voxels representative of discrete volumetric portions of the physical environment and defined by a first resolution and a second resolution, the first resolution being coarser than the second resolution, the second multi-resolution voxel space comprises a second plurality of voxels representative of discrete volumetric portions of the physical environment and defined by the first resolution and the second resolution, and the resolution is the first resolution.

9. The one or more non-transitory computer-readable media of claim 8, wherein:

the voxel is a first voxel and associated with the first resolution; and the operations further comprise:

responsive to determining that an average residual of the alignment is less than or equal to a threshold:

determining a second quality metric of a second voxel associated with the first multi-resolution voxel space and the second multi-resolution voxel space based at least in part on one or more of a number of points associated with the second voxel, a semantic class associated with the second voxel, an eigenvalue associated with the second voxel, or a resolution associated with the second voxel;

determining a second residual associated with the second voxel; and generating, based at least in part on the second quality metric, the second residual, and the alignment, an updated alignment.

10. The one or more non-transitory computer-readable media of claim 9, further comprising:

creating a map based at least in part on the updated alignment; and transmitting, to the autonomous vehicle, the map.

11. The one or more non-transitory computer-readable media of claim 7, wherein the voxel is a statical combination of first data associated with a voxel of the first multi-resolution voxel space and second data associated with a voxel of the second multi-resolution voxel space.

12. The one or more non-transitory computer-readable media of claim 11, wherein determining the residual further comprises determining a dot product of an eigenvector of the voxel and vector indicative of a separation between a voxel of the first multi-resolution voxel space and a voxel of the second multi-resolution voxel space.

13. The one or more non-transitory computer-readable media of claim 7, wherein the voxel is a first voxel and determining the first-residual comprises:

determining a set of data associated with the first voxel and a second voxel;

determining an eigenvector of the set of data;

determining a vector between the mean of data associated with the first voxel and a mean of data associated with the second voxel; and determining, as the residual, a dot product between the eigenvector and the vector.

14. A method comprising:

determining, by one or more processors, a quality metric of a voxel associated with a first multi-resolution voxel space and a second multi-resolution voxel space based at least in part on one or more of a number of points associated with the voxel, a semantic class associated with the voxel, an eigenvalue associated with the voxel, or a resolution associated with the voxel;

determining, by the one or more processors, a residual associated with the voxel;

determining, by the one or more processors and based at least in part on the quality metric and the residual, an alignment between the first multi-resolution voxel space and the second multi-resolution voxel space; and generating, by the one or more processors and based at least in part on the alignment, a three-dimensional map representing an environment.

15. The method of claim 14, wherein:

the first multi-resolution voxel space comprises a first plurality of voxels representative of discrete volumetric portions of a physical environment and defined by a first resolution and a second resolution, the first resolution being coarser than the second resolution; and the second multi-resolution voxel space comprises a second plurality of voxels representative of discrete volumetric portions of the physical environment and defined by the first resolution and the second resolution; and the resolution is the first resolution.

16. The method of claim 14, wherein:

the voxel is a first voxel and associated with a first resolution of the first multi-resolution voxel space; and the method further comprises:

responsive to determining that an average residual of the alignment is less than or equal to a threshold:

determining, by the one or more processors, a second quality metric of a second voxel associated with the first multi-resolution voxel space and the second multi-resolution voxel space based at least in part on one or more of a number of points associated with the second voxel, a semantic class associated with the second voxel, an eigenvalue associated with the second voxel, or a resolution associated with the second multi-resolution voxel space;

determining, by the one or more processors, a second residual associated with the second voxel; and generating, by the one or more processors and based at least in part on the second quality metric, the second residual, and the alignment, an updated alignment.

17. The method of claim 16, further comprising outputting the updated alignment responsive to determining the updated alignment achieving or exceeding a convergence threshold.

18. The method of claim 16, wherein the voxel is a statical combination of first data associated with a voxel of the first multi-resolution voxel space and second data associated with a voxel of the second multi-resolution voxel space.

19. The method of claim 18, wherein determining the residual further comprises determining a dot product of a unit vector of the voxel and a mean of the voxel of the first multi-resolution voxel space minus a mean of the voxel of the second multi-resolution voxel space.

20. The method of claim 14, further comprising:

transmitting, by the one or more processors and to an autonomous vehicle, the three-dimensional map, wherein the autonomous vehicle is localized in an environment based at least in part of the three-dimensional map.

* * * * *